United States Patent
Eitel et al.

(10) Patent No.: US 10,864,851 B2
(45) Date of Patent: Dec. 15, 2020

(54) BACKLIT DECORATIVE SURFACE, PARTICULARLY FOR THE INTERIOR FINISHING OF MOTOR VEHICLES

(71) Applicant: EISSMANN AUTOMOTIVE DEUTSCHLAND GMBH, Bad Urach (DE)

(72) Inventors: Norman Eitel, Eningen (DE); Joachim Totzl, Aichtal (DE)

( * ) Notice: Subject to any disclaimer, the term of this patent is extended or adjusted under 35 U.S.C. 154(b) by 0 days.

(21) Appl. No.: 16/347,225

(22) PCT Filed: Oct. 4, 2017

(86) PCT No.: PCT/EP2017/075211
§ 371 (c)(1),
(2) Date: May 3, 2019

(87) PCT Pub. No.: WO2018/082856
PCT Pub. Date: May 11, 2018

(65) Prior Publication Data
US 2019/0283667 A1 Sep. 19, 2019

(30) Foreign Application Priority Data
Nov. 4, 2016 (DE) .......................... 10 2016 121 042

(51) Int. Cl.
*B60Q 3/54* (2017.01)
*B60Q 3/64* (2017.01)
(Continued)

(52) U.S. Cl.
CPC .................. *B60Q 3/54* (2017.02); *B32B 7/12* (2013.01); *B60Q 3/64* (2017.02); *B60R 13/02* (2013.01);
(Continued)

(58) Field of Classification Search
CPC ............... B32B 7/12–14; B32B 3/266; B60R 13/02–0275; B60Q 3/54
See application file for complete search history.

(56) References Cited

U.S. PATENT DOCUMENTS 5,609,938 A * 3/1997 Shields ................. B44C 1/1733
359/594
5,743,408 A * 4/1998 Hill ......................... B60R 13/02
206/575
(Continued)

FOREIGN PATENT DOCUMENTS

DE 102004039938 3/2005
DE 102006058257 6/2008
(Continued)

OTHER PUBLICATIONS

DE 102011016813 A1 English machine translation (Year: 2012).*

*Primary Examiner* — Mariceli Santiago
(74) *Attorney, Agent, or Firm* — Mark Wisnosky

(57) ABSTRACT

A planar decorative material (11), for interior furnishing, with perforations (12), in particular for the automotive industry, which serves to be illuminated, on its rear side (13), with a illumination device (18) and permits a part of the light of the illumination device (18) to pass from the rear side (13) of the decorative material (11) through the perforations (12) to the visible side (14) of the decorative material (11), wherein a film (20) adheres onto the rear side (13) of the decorative material (11), and the perforations (12) extend through the film (20) as far as to the visible side (14) of the decorative material (11), and the film (20) is an adhesive film activatable by increase in temperature and/or pressure, which can be permanently adhesively-bonded onto the illumination device (18) under increase in temperature to a
(Continued)

Figure 1:
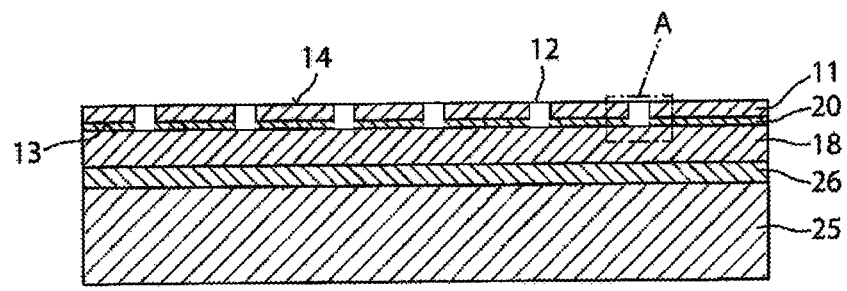

temperature T2 and/or increase in pressure to a pressure p2. The present invention also relates to a manufacturing method.

22 Claims, 1 Drawing Sheet

(51) Int. Cl.
    *B32B 7/12*     (2006.01)
    *B60R 13/02*     (2006.01)
    *C09J 175/04*     (2006.01)

(52) U.S. Cl.
    CPC .. *B60Q 2500/10* (2013.01); *B60R 2013/0287* (2013.01); *C09J 175/04* (2013.01)

(56) References Cited

U.S. PATENT DOCUMENTS

| | | | | |
|---|---|---|---|---|
| 2012/0320615 | A1* | 12/2012 | Englert | B60Q 3/54 362/511 |
| 2012/0327673 | A1* | 12/2012 | Ureta Hortiguela | B60R 13/0225 362/490 |
| 2020/0025996 | A1* | 1/2020 | Kautz | B60Q 3/64 |

FOREIGN PATENT DOCUMENTS

| | | | | |
|---|---|---|---|---|
| DE | 102007006201 | | 8/2008 | |
| DE | 102010043486 | | 5/2011 | |
| DE | 102011016813 | A1 * | 10/2012 | ............ F16B 11/006 |
| DE | 102013202223 | | 8/2014 | |
| DE | 102013012201 | | 1/2015 | |
| DE | 102011082344 | | 4/2015 | |

* cited by examiner

BACKLIT DECORATIVE SURFACE, PARTICULARLY FOR THE INTERIOR FINISHING OF MOTOR VEHICLES

The present invention relates to a back-lightable decorative surface, in particular for the interior furnishing of motor vehicles.

In the field of the interior design of vehicles, it is common to laminate support members such as instrument panels, door inside trims, vehicle head-linings or central consoles with planar decorative materials such as leather, artificial leather or Alcantara or other textiles. Frequently, the planar decorative material is not directly laminated onto the support member, but rather a spacer knitted fabric or foam material is provided between support member and decorative material in order to impart an appealing haptic impression.

Solvent, dispersoid, or hot-melt adhesive materials are generally employed for bonding of the layers.

In the last several years, a trend towards back-lightable surfaces has developed. A light guide is hereby basically applied onto a carrier material, which guide is illuminated with a light source, such as an LED lamp. An at least partially transparent layer is provided above the light guide. In nocturnal operation, that is when the light source is switched on, the light is guided from the light source through the light guide and then passes, at the locations of the partially transparent layer permeable for the light, through this layer and into the motor vehicle interior space. In order to achieve a uniform, spatial light distribution, a diffuser is often times provided between the light guide and the partially light-permeable layer.

An appealing ambient lighting can, in particular in darkness, be achieved in the vehicle interior space with such backlit or back-lightable surfaces, which lighting, in bright light, is nearly invisible.

In the field of the upscale vehicle interior furnishing, the wish exists to also make available backlit surface with high-quality non-transparent or translucent decorative materials, such as leather or artificial leather. Because such decorative materials are not transparent or not translucent, it is necessary to introduce holes or perforations in these materials so that the light in the light guide on the rear side of the decorative material can pass through the decorative material onto the visible side.

If, however, holes or perforations are introduced into the decorative material and subsequently adhesive material is applied onto the rear side of the decorative material in order to bond said material to the diffuser or light guide, a part of the adhesive material intrudes into the holes or perforations in the decorative material. Because the adhesive material is located in a perforation between the lightguide and the visible side, and the adhesive material is thus also "backlit", it is, for one thing, visible from the visible side of the decorative material, which looks unsightly. For another thing, the differing amount and distribution of the adhesive material in the perforations also causes the intensity and distribution of the light transmitted through the perforation to fluctuate from perforation to perforation, so that no uniform illumination is achieved.

Moreover, it is desirable that the manufacture of such backlit decorative materials fulfills the requirements of a production process in an industrial serial production, i.e. that the cut-to-size, perforated decorative materials can be stored non-destructively over multiple weeks and laminated onto the illumination element only at a later point in time. DE 10 2011 082 344 A1 discloses a planar decorative material for interior furnishing, with perforations, which serves to be illuminated on its rear side with an illumination device and to permit a part of the light of the illumination device to pass from the rear side of the decorative material through the perforations to the visible side of the decorative material. In this case, the leather is hereby brought into the corresponding shape, and the perforations are then introduced into the rear side of the leather, in order to avoid a distortion of the perforations during the shaping. Finally, the leather is, if necessary, coated with a transparent barrier film on the visible side and/or rear side, or a stabilizing material is introduced into the openings. The leather is then laminated onto a carrier material.

DE 10 2007 006 201 A1 discloses a film, which is an adhesive film activatable under increase in temperature and/or pressure.

The object of the present invention lies with providing a back-lightable decorative material, which comprises an visually-appealing, defined transillumination and simultaneously meets the requirements of a production process in industrial serial production. Disclosing a manufacturing method to this effect is likewise an object of the present invention.

This object is achieved by the features of claims 1 and 11.

The planar decorative material according to the invention comprises perforations and serves to be illuminated, on its rear side, with an illumination device and to permit a part of the light of the illumination device to pass from the rear side of the decorative material, through the perforations, to the visible side of the decorative material, wherein a film adheres to the rear side of the decorative material, and the perforations extend, through the film, to the visible side of the decorative material, and the film is an adhesive film activatable by increase in temperature and/or pressure, which, under the effect of a pressure $p2$, and/or under a temperature increase to a temperature $T2$, can be permanently adhesively-bonded or laminated onto the illumination device.

By virtue of the fact that the rear side of the decorative material is bonded to or initially is being bonded to the film, and only then the perforations are introduced into the composite of film and decorative material, no adhesive material can penetrate into the perforations, and the beam path inside the perforation can thusly not be disrupted, so that, in the region of the perforations, an optically-appealing and reproducible transillumination or backlighting is achieved.

According to the invention, the film is a latently reactive adhesive film, i.e. an adhesive film which, by increase in temperature and/or under the impact of pressure can be made sticky for the permanent adhesive-bonding. Under these "activation conditions for the permanent adhesive-bonding", i.e. the increase in temperature to a temperature $T2$ and/or the impact of a pressure $p2$, the film is very sticky and can then be laminated onto the illumination device and can fully crosslink.

Particularly preferably, the activation occurs through temperature increase to $T2$ and pressure increase to $p2$.

Below the "activation conditions for the permanent adhesive-bonding" of the temperature $T2$ and the pressure $p2$, the adhesive film is either not sticky, which is the case below a temperature $T1$ or below a pressure $p1$. Above the temperature $T1$ and the pressure $p1$, which together form the "activation conditions for the pre-fixing", the adhesive film is somewhat sticky, namely sticky to the extent that it can be laminated onto the rear side of the leather and adheres there, within the framework of a pre-fixing process. After the adhesive film is laminated onto the leather at the temperature T1 and the pressure p1, the composite can again be cooled to room temperature, perforated, and be stored under normal pressure.

In general, decorative material and film are cut to size prior to the pre-fixing, and are only then pre-fixed.

In general, the perforated cut-to-size-section of decorative material and film can be stored at a cool, dry place over a longer time duration of up to 6 months and, if necessary, be transported, in order to then be bonded onto the illumination device under the impact of a higher temperature T2 than the temperature T1 and/or a higher pressure p2 than the pressure p1, namely under the activation conditions for the permanent adhesive-bonding.

Alternatively, the cut-to-size-section of decorative material and film will be cooled after the pre-fixing and stored, and the perforations are introduced into the cut-to-size-section only at a later point in time, and then the perforated cut-to-size section is—if necessary with a further intermediate storage—laminated onto the illumination device—under the activation conditions T2 and/or p2, for the permanent adhesive-bonding.

Because it is possible to store the decorative materials coated with the latently-reactive adhesive film over months and to activate said materials only at later point in time under the contact pressure p2 and increased temperature T2, and to laminate said materials on the respective part, namely the illumination device, the requirements for the industrial serial assembly are fulfilled.

The decorative material laminated onto the illumination device by means of the film can subsequently, with the lower side of the illumination device, be bonded to a carrier element, such as a door trim, a spacer knitted fabric or a foam material.

The temperature T1 for the pre-fixing, i.e. the temperature at which the film is slightly sticky can be pre-fixed, generally ranges below 60° C., preferably between 40° C. and 55° C. Depending on the adhesive film used, the temperature can, however, also be higher or lower. The pressure p1 for the pre-fixing generally ranges at up to 20 N/cm$^2$, preferably between 10 N/cm$^2$ and 20 N/cm$^2$, and particularly preferably at around 15 N/cm$^2$.

The activation temperature T2 for the permanent adhesive-bonding generally amounts to at least 60° C., and preferably between 70° C. and 110° C. At these temperatures, an optimal, nearly undetachable bonding can be achieved, without the decorative material being damaged through the heat input. Depending on the adhesive film used, the temperature can, however, also be higher or lower.

The contact pressure p2 for the crosslinking activation (permanent adhesive-bonding) ranges between 0.5 N/cm$^2$ and 25 N/cm$^2$, and particularly preferably between 0.5 N/cm$^2$ and 2.0 N/cm$^2$, depending on material to be pressed. The contact pressures are high enough that they make the pre-fixing or the crosslinking activation possible, but low enough that the decorative material is not damaged.

After the activation, the adhesion must still completely crosslink. Generally, the necessary (post)crosslinking time can be reduced through a longer activation time.

Generally, the post-crosslinking time is 24 to 48 hours.

Through the temperature and/or pressure increase to T2 and/or p2, the film, only pre-fixed in the first step, is also bonded to the decorative material in the first step, now permanently adhesively-bonded to the decorative material.

The decorative material is in particular a planar material like leather, artificial leather, synthetic material, Alcantara or also a textile material. Generally, the decorative material is impermeable to light. The layer thickness of the decorative material preferably ranges between 0.5 mm and 3.0 mm, and particularly preferably between 0.8 mm and 2.0 mm.

The film is in particular an adhesive-material film manufactured on a polyurethane basis with an integrated second component, which, upon activation to a temperature T2 and a pressure p2, starts to react with the first component, and thereby produces a high-strength bonding. The second component is preferably an isocyanate, which is preferably present in encapsulated form.

Generally, the layer thickness of the film amounts to between 25 and 200 micrometers, and preferably between 70 and 130 micrometers.

In a variant of the invention, the decorative material can, however, also have a slight light-permeability, so that even without perforations, a minimal light amount already exits on the visible side of the decorative material upon backlighting.

The most different of perforations can essentially be introduced into the decorative material. In a first preferred embodiment, the perforations are respectively spaced from another with uniform distances, in a further preferred embodiment, the distances of the perforations amongst one another are different.

Arbitrary shapes of the perforations are possible, circular-shaped perforations, rectangular, triangular perforations, star-shaped perforations, quadratic perforations, letters, logos, etc. The larger the perforation, the more light passes through a perforation and the brighter the backlighting is.

Various different perforations can also be combined.

A brighter central region of the backlighting can, for example, be achieved in that the perforations in the center are larger and or are arranged with a smaller distance from one another than in the peripheral region.

Generally, the diameter of a perforation should amount to between 0.5 and 5 mm, preferably between 0.8 and 3 mm, in order to, on the one hand, achieve a minimum passage of light through a perforation, on the other hand, however, to also maintain the material properties, visual appearance, haptics, and flatness of the decorative material.

The perforations basically have a cylindrical shape, i.e. the perforations extend under a right angle to the surface of the decorative material. The perforations can all have the same cross-section or a different cross-section.

The illumination device includes a light source, such as for example an LED lamp. In addition, the illumination device can also include a light guide, for example of silicone, a light diffuser and a reflector.

The light diffuser, which can be a non-woven material, a spacer knitted fabric or another light-scattering textile, is generally arranged on the side of the film facing away from the decorative layer and ensures that diffuse light is radiated into the perforations.

Generally, a reflector is arranged on the other side of the light guide, which causes the light to be guided along the light guide and reach all perforations.

Preferably, the film is bonded to the upward-facing side of a diffuser which diffuser, in turn, is located on the upward-facing side of the light guide, and wherein a reflector is arranged on the lower side of the light guide. A light source, e.g. an LED lamp, is located laterally of the light guide, the light of which source is radiated into the light guide.

The components can, of course, also be arranged differently.

The invention is further described in the following based on an exemplary embodiment.

Figure 2:
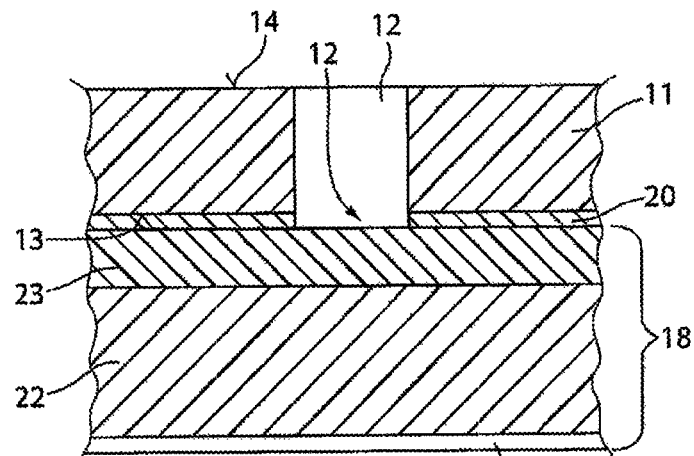
Figure 3:
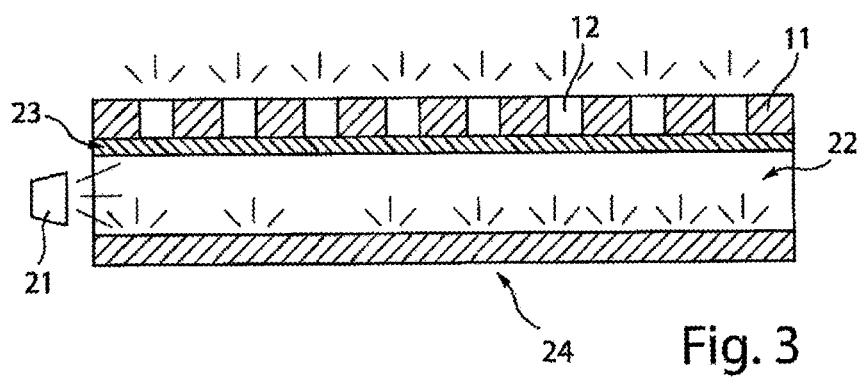

Shown are in:

FIG. 1 a schematic view of the layer construction of a door trim with backlit decorative layer, FIG. 2 an enlarged view of the region A of FIG. 1, in which the film is also visible, and FIG. 3 a representation of the general functional principle of the backlighting.

The decorative material 11 in FIGS. 1 and 2, with the visible side 14, faces upwardly into the vehicle interior space.

In the enlarged representation in FIG. 2, one recognizes that the decorative material 11, with its rear side 13, is bonded with the film 20 over the entire surface. Decorative material 11 and film 20 were cut to size before the pre-fixing.

The film 20 is a latently-reactive adhesive film which, in a first temperature T1 and under a first contact pressure p1, roughly ranging at 50° C. and 5 N/cm², can be transformed into the slightly sticky state for the pre-fixing. In this state, the film 20, with the side thereof facing-upward in FIG. 2, is slightly bonded (pre-fixed) to the rear side 13 of the decorative material 11. This pre-fixing is sufficient in order to avoid a detaching of the adhesive film from the decorative material 11 or a slipping during storage or during the perforating.

The film obtainable at H. B. Fuller under the designation Flexee™ EM9002 can, for example be used as film 20, with a layer thickness of 100 micrometers being preferred.

After the pre-fixing, the perforations 12 can now be introduced into the fixed, cut-to-size section of decorative material 11 and film 20, for example by means of a punch. Here, the perforations 12 extend through the decorative material 11 and through the film 20.

In FIGS. 1 and 3, the spacings of the perforations 12 are partially different among themselves.

The perforated cut-to-size section can then, as the case may be after a storage of up to 6 months, be activated to the activation temperature T2 of 75° C. to 110° C. and then the perforated cut-to-size section can, under a contact pressure of 5 to 20 N/cm², be permanently adhesively-bonded to the illumination device 18. A firm adhesive connection is thereby reached between the film 20 and the illumination device 18. Under the activation conditions for the permanent adhesive-bonding, a complete crosslinking of the still non-completed adhesion due to the pre-fixing, between the decorative material 11 and the film 20 is also simultaneously achieved.

If desired, another spacer knitted fabric or foam material 26 can be subsequently laminated onto the side of the illumination device 18 facing away from the decorative material 11, and the composite can then, via the lower side of the spacer knitted fabric or foam material 26, be bonded to a support member 25 of a door trim. Of course, the spacer knitted fabric 26 can also initially be adhered with the support member 25 and then the composite of decorative material 11/film 20/illumination device 18 can be bonded thereon. Likewise, in the layer structure, the spacer knitted fabric or foam material 26 can also be omitted.

The illumination device 18 includes a light source 21, such as an LED lamp, a preferably flexible light guide 22, a reflector 24 and a diffuser 23. The diffuser 23 is planar, and can be a non-woven material, for example. It serves to make the light generated in the light source 21 diffuse, and thus to prevent a directed, blinding radiation of light.

In this variant, the diffuser 23 forms the upper outer side of the illumination device 18. Insofar as no diffuse backlighting is desired, the diffuser 23 can also be omitted.

We claim:

1. Planar decorative material for vehicle interiors having an upper, visible side, and a lower side that is attached to an illumination device, the planar decorative material comprising:
    a) a first layer having an upper surface and a lower surface, the upper surface is the upper, visible side of the planar decorative material, and,
    b) a second layer having an upper surface and a lower surface, and the upper surface of the second layer is attached to the lower surface of the first layer, and,
    c) perforations that penetrate completely through both the first layer and the second layer, and,
    d) the lower surface of the second layer attached to the illumination device, such that a part of a light from the illumination device passes through the first layer and the second layer, and, out the visible surface of the planar decorative material, and,
    e) the second layer, is an adhesive film, that is activated by an increase in temperature and/or pressure, and the second layer is pre-laminated onto the lower surface of the first layer by application with increase to a first temperature T1, which is lower than a second temperature T2, and/or a first pressure increase to P1, which is lower than or equal to a second pressure P2, and,
    f) the second layer is permanently bonded onto the illumination device under an increase in temperature to temperature T2 and/or increase in pressure to pressure P2.

2. Planar decorative material according to claim 1, characterized in that the perforations have a cylindrical shape.

3. Planar decorative material according to claim 1, characterized in that the temperature T1 is less than 60° C.

4. Planar decorative material according to claim 1, characterized in that the temperature T1 is between 40° C. and 55° C.

5. Planar decorative material according to claim 1, characterized in that the pressure P1 is less than 20 N/cm2.

6. Planar decorative material according to claim 1, characterized in that the pressure P1 is between 10 N/cm2 and 20 N/cm2.

7. Planar decorative material according to claim 1, characterized in that the temperature T2 is at least 60° C.

8. Planar decorative material according to claim 1, characterized in that the temperature T2 is between 70° C. and 110° C.

9. Planar decorative material according to claim 1, characterized in that the pressure P2 is between 0.5 N/cm2 and 25 N/cm2.

10. Planar decorative material according to claim 1, characterized in that the pressure P2 is between 0.5 N/cm2 and 2.0 N/cm2.

11. Planar decorative material according to claim 1, wherein the second layer comprises polyurethane and an encapsulated isocyanate, which, when heated to a temperature T2 and a pressure P2, reacts with the polyurethane and thereby generates a high-strength bonding.

12. Planar decorative material according to claim 1, characterized in that the layer thickness of the film amounts to between 25 and 200 micrometers.

13. Planar decorative material according to claim 1, characterized in that the layer thickness of the second layer is between 70 and 130 micrometers.

14. Planar decorative material according claim 1, wherein the illumination device includes a light source, a light guide, a diffuser and a reflector.

15. Planar decorative material according to claim 14, wherein the illumination device is attached to a door trim, a spacer knitted fabric or a foam material.

16. Planar decorative material according to claim 1, wherein the thickness of the first layer is between 0.5 mm and 3.0 mm.

17. Planar decorative material according to claim 1, wherein the thickness of the first layer is between 0.8 mm and 2.0 mm.

18. Planar decorative material according to claim 1, wherein the diameter of the perforations is between 0.5 mm and 5 mm.

19. A method for manufacturing a backlit decorative material for a surface of a vehicle interior, the method comprising:
   a) laminating a second layer onto a first decorative layer at a first temperature T1 and a first pressure P1, producing a laminated first decorative layer and second layer, and,
   b) perforating the laminated first decorative layer and second layer, producing a perforated and laminated first decorative layer and second layer, and,
   c) laminating the perforated first decorative layer and the second layer onto an illumination device under heating to a temperature T2, which is higher than the temperature T1.

20. The method according to claim 19, wherein the first decorative layer and the second layer are cut to size prior to the laminating a second layer onto a first decorative layer at a first temperature T1 and a first pressure P1.

21. Planar decorative material for attachment to a surface of a vehicle's interior, the planar decorative material having an upper, visible side, and a lower side that is attached to the surface of the vehicle's interior, the planar decorative material comprising:
   a) a first layer having an upper surface and a lower surface, the upper surface is the upper, visible side of the planar decorative material, and,
   b) a second layer having an upper surface and a lower surface, and the upper surface of the second layer is attached to the lower surface of the first layer, and,
   c) perforations that penetrate completely through both the first layer and the second layer, and,
   d) the lower surface of the second layer attached to the surface of the vehicle's interior, and,
   e) the second layer, is an adhesive film, that is activated by an increase in temperature and/or pressure, and the second layer is pre-laminated onto the lower surface of the first layer by application with increase to a first temperature T1, which is lower than a second temperature T2, and/or a first pressure increase to P1, which is lower than or equal to a second pressure P2, and,
   f) the second layer is permanently bonded onto the surface of the vehicle's interior under an increase in temperature to temperature T2 and/or increase in pressure to pressure P2.

22. Planar decorative material according to claim 21, wherein the second layer comprises polyurethane and an encapsulated isocyanate, which, when heated to a temperature T2 and a pressure P2, reacts with the polyurethane and thereby generates a high-strength bonding.

* * * * *